(12) United States Patent
Kerselaers et al.

(10) Patent No.: US 10,595,174 B2
(45) Date of Patent: Mar. 17, 2020

(54) METHOD AND APPARATUS FOR DYNAMICALLY DISTRIBUTING INFORMATION IN A VEHICLE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/039,557

(22) Filed: Jul. 19, 2018

(65) Prior Publication Data

US 2019/0082313 A1    Mar. 14, 2019

(30) Foreign Application Priority Data

Sep. 13, 2017   (EP) ..................... 17190865

(51) Int. Cl.
| | |
|---|---|
| *H04W 4/40* | (2018.01) |
| *H04W 52/38* | (2009.01) |
| *H04W 88/06* | (2009.01) |
| *G07C 5/00* | (2006.01) |
| *H04L 29/08* | (2006.01) |
| *B60W 30/09* | (2012.01) |

(52) U.S. Cl.
CPC .............. *H04W 4/40* (2018.02); *B60W 30/09* (2013.01); *G07C 5/008* (2013.01); *H04L 67/12* (2013.01); *H04W 52/383* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2011/0098877 A1 | 4/2011 | Stahlin et al. | |
| 2012/0106537 A1 | 5/2012 | Yousefi et al. | |
| 2015/0302738 A1 | 10/2015 | Geerlings et al. | |
| 2016/0036499 A1 | 2/2016 | Burchard et al. | |
| 2018/0103441 A1* | 4/2018 | Lim ................... | H04W 52/383 |
| 2018/0288589 A1* | 10/2018 | Punithan ............. | H04W 4/46 |

FOREIGN PATENT DOCUMENTS

| | | |
|---|---|---|
| WO | 2016058681 A1 | 4/2016 |
| WO | 2016198816 A1 | 12/2016 |

* cited by examiner

*Primary Examiner* — Kouroush Mohebbi

(57) ABSTRACT

A wireless vehicle communication system (500, 600) includes a vehicle (200) having a plurality of wireless communication units (220, 240, 260) located in or attached to the vehicle (200). The plurality of wireless communication units is configured to operate in a first communication mode of operation that wirelessly transfers data to a communication unit located in a vicinity of the vehicle (200). The plurality of wireless communication units (220, 240, 260) is additionally configured to operate in a second communication mode of operation that wirelessly transfers data to at least one other of the plurality of communication units (220, 240, 260) located In or attached to the vehicle (200).

22 Claims, 8 Drawing Sheets

METHOD AND APPARATUS FOR DYNAMICALLY DISTRIBUTING INFORMATION IN A VEHICLE

CROSS-REFERENCE TO RELATED APPLICATIONS

This application claims the priority under 35 U.S.C. § 119 of European Patent application no. 17190865.0, filed on 13 Sep. 2017, the contents of which are incorporated by reference herein.

FIELD OF THE INVENTION

The field of this invention relates to a method and apparatus for dynamically distributing data within a vehicle. The field of this invention is applicable to, but not limited to, wirelessly distributing intelligent traffic system information between master/slave communication units.

BACKGROUND OF THE INVENTION

It Is known that road usage by vehicles continues to increase, year on year. Increased road usage causes many problems, such as increased congestion, longer travel time, higher travel costs, increased air pollution, increased accident risk, etc. In order to cope with this steady increase, solutions are required to better manage vehicle road usage. A possible solution is to construct new roads, which is unlikely to happen on a large enough scale. A further solution is to reduce traffic and/or provide alternative transportation options, neither of which is viable in most practical scenarios.

A further solution that is being widely researched and developed is the use of intelligent traffic (or transportation) systems (ITS). Intelligent transportation systems (ITS) are applications which provide, for example, services relating to transport and traffic management and enable various users to be better informed and make safer, more coordinated, and 'smarter' use of transport networks. ITS is also being considered to facilitate autonomous driving. Although ITS may refer to all modes of transport, ITS is defined in EU Directive 2010140/EU (7 Jul. 2010) as systems in which information and communication technologies are applied in the field of road transport, including infrastructure, vehicles and users, and in traffic management and mobility management, as well as for interfaces with other modes of transport.

Various forms of wireless communications technologies have been proposed for intelligent transportation systems. IEEE 802.11p is an approved amendment to the IEEE 802.11 standard to add Wireless Access In Vehicular Environments (WAVE™), a vehicular communication system. It defines enhancements to 802.11 (the basis of products marketed as Wi-Fi™) required to support ITS applications. The 802.11p standard, as with other Wi-Fi™ standards such as 802.11a, 802.11g, 802.11n, 802.11ac, etc., is packet based and each packet consists of preamble symbols and data symbols. This includes data exchange between high-speed vehicles and between the vehicles and the roadside infrastructure. Such a range of communications is often referred to as 'vehicle to everything (V2X)' communications.

Today's vehicles are also equipped with many wireless services to receive radio and television broadcasting and to support communications technologies, such as cellular phone and global positioning system GPS™ for navigation. The vehicle-to-vehicle communication systems in Europe and USA make use of the IEEE802.11p standard, which operates in bends: ITS-G5A, ITS-G5B and ITS-G5D: 5.855-5.925 GHz. The Japanese ARIB STD-T109 standard dedicates the operating frequency bend of 755.5-764.5 MHz ITS, with a centre frequency of 760 MHz and an occupied bandwidth of 9 MHz or less. Typical ITS networks contain vehicles with at least two communication units, each able to establish communication with other cars or devices near the road and at the same time communicate with each other.

In most practical applications, it is known that in order to support communication in all directions around the car at least two V2X communication units are required. This is because, in practical situations, first the rooftop of a vehicle is not horizontal but has an inclination; and secondly many rooftops are not made completely from metal but contain glass or plastics, thereby causing imperfections in the transmitted and received communication signals. In the widely-used shark fin antenna design, multiple antenna structures will be closely spaced together influencing one and others' characteristics. These effects result in a non-omnidirectional radiation pattern, which results in at least two V2X communication units (and two antennas separated physically as much as possible) being typically required to achieve a best or at least an acceptable performance. A skilled artisan will appreciate that a sufficient spatial separation is required for obtaining as much as possible isolation between the two feeding ports and to uncorrelate the antenna parameters.

In order to manage communication between the at least two communication units within the vehicle, the vehicle includes an Ethernet connection that links the at least two communication units. This Ethernet connection involves more than introducing a cable, as the in-vehicle system requires extra integrated circuits (ICs) to support wireline transceiver functionality, synchronization, managed voltage supplies to ensure electromagnetic interference (EMI) rejection is within specified limits, etc. Transmitters and receivers are typically implemented as integrated circuits where the particular functions are implemented as hardware blocks, with software running on (digital signal) processors, or a combination of hardware and software. Thus, the in-vehicle communication system to supplement V2X communication has resulted in being an additional complex and expensive system.

SUMMARY OF THE INVENTION

The present invention provides a communication unit and method for wirelessly distributing data within a vehicle, a vehicle and a distributed wireless communication system for a vehicle, as described in the accompanying claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to the accompanying drawings in which there are illustrated example embodiments. However, it will be appreciated that the present invention is not limited to the specific embodiments herein described and as illustrated in the accompanying drawings, and various modifications and alternatives may be made without detracting from the inventive concept.

Figure 1:
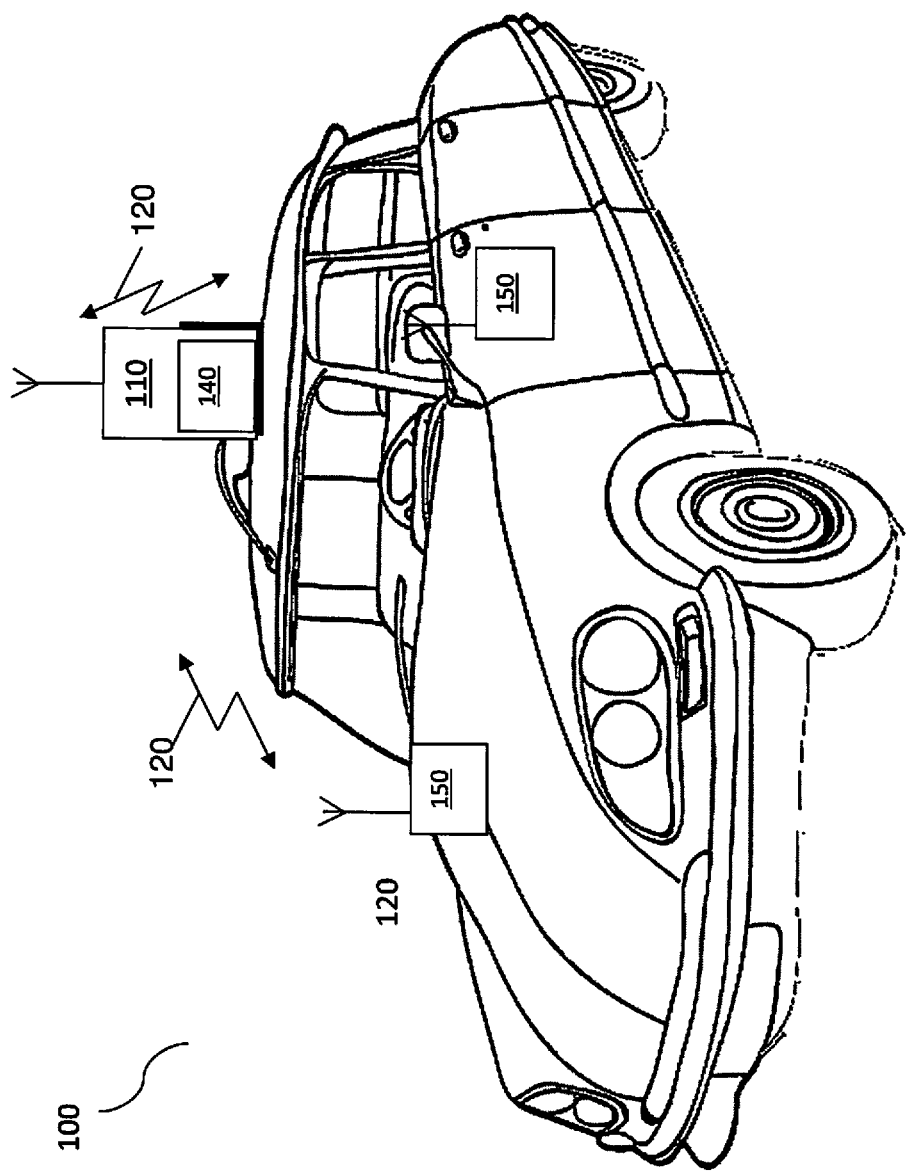
FIG. 1 illustrates a simplified diagram of a vehicle employing a plurality of V2X communication units, adapted to wirelessly distribute data within the vehicle, according to example embodiments of the invention.

Referring now to FIG. 1, a simplified diagram of a vehicle 100 employing a plurality of communication units 110, 150, configured as, or to include, ITS functionality, adapted to wirelessly distribute data within the vehicle 100, is illustrated according to example embodiments of the invention. The communication units 110, 150, include at least an antenna, a radio transceiver, a processing unit with appropriate software, and optionally a security processor and a user interface.

In this example, the communication units 110, 150 are configured to wirelessly distribute in a second mode of operation date, for example as obtained in a first mode of operation, such as from V2X received data, as described below. In particular, a wireless vehicle network system is provided, whereby the second wireless communication mode is suitable for local network wireless communication between V2X communication units within the vehicle 100. In some examples, it is envisaged that the communication units may be configured to support a plurality of frequency bands, dependent upon the geographical area of use/sale. As the second wireless communication mode is suitable for local network wireless communication between V2X communication units within the vehicle 100, it is envisaged that one of the other supported frequency bands (other than that used in normal V2X communications in the first mode of operation) may be used as a dedicated, very low-power, in vehicle wireless communication link for the second wireless communication mode. In one example, the plurality of frequency bands supported by, say, an integrated transceiver and baseband/medium access control (MAC) layer processing unit could include, say four frequency bends, WAVE® in Japan at 760 MHz, Wi-Fi® from 2.4 to 2.5 GHz, Wi-Fi™ from 4.9 to 5.85 GHz and WAVE™ 802.11p 5.85 to 5.95 GHz.

Although examples of the invention are described with reference to a vehicle, such as a car as illustrated in FIG. 1, it is envisaged that any mobile road transport structure may use the concepts herein described, such as trucks, motorcycles, buses, etc.

Figure 2:
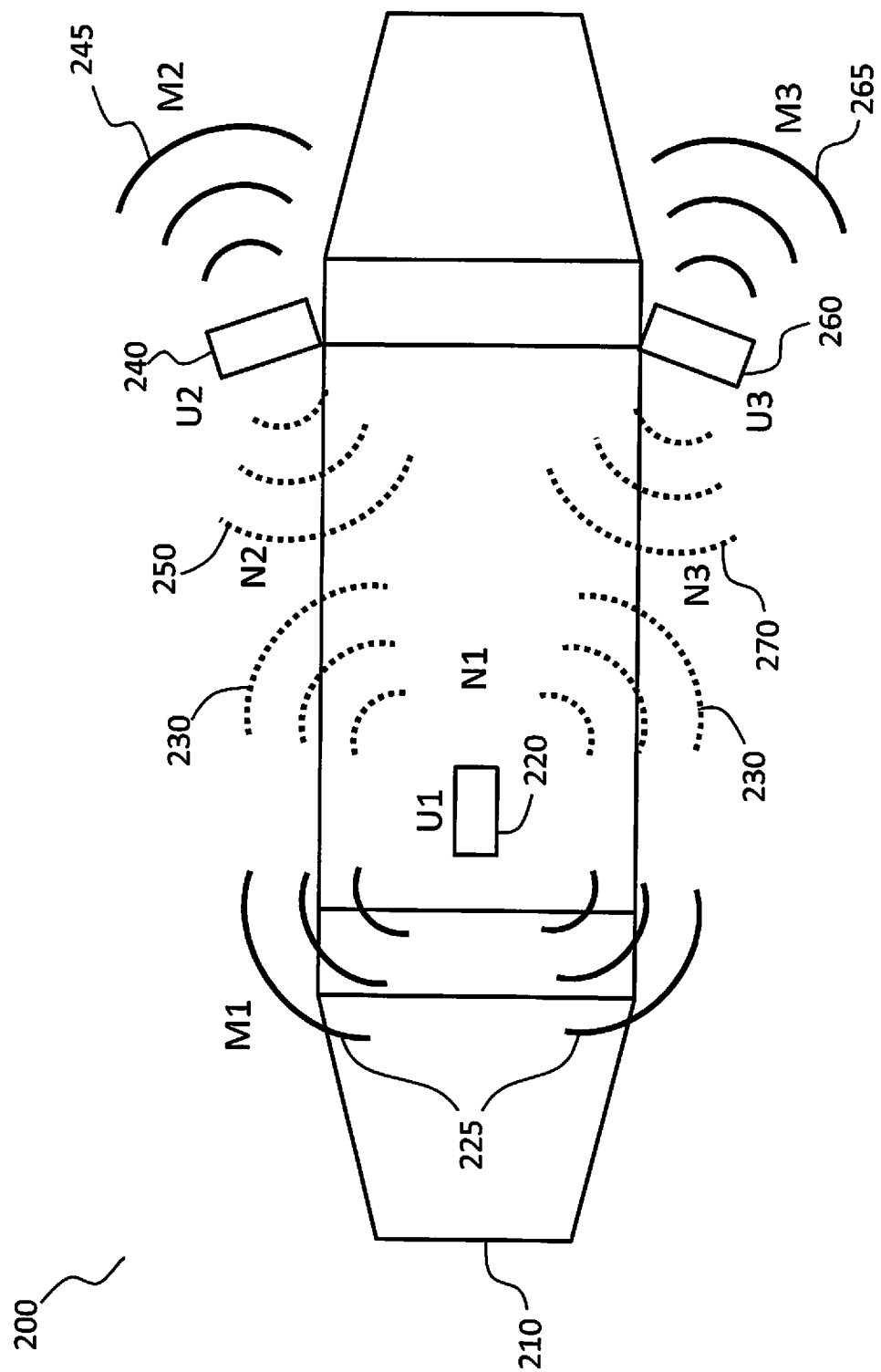
FIG. 2 illustrates a simplified illustration of a top view of a vehicle equipped with communicating V2X communication units, according to example embodiments of the invention.

Referring now to FIG. 2, a vehicle 200 is illustrated, where the vehicle 200 is equipped with a number of V2X communication units, namely in this example three V2X communication units U1 220, U2 240 and U3 260. The communication units consist of at least an antenna, a radio transceiver processing unit with the appropriate software, and optionally a security processor and a user interface. In this example, a first V2X communication unit U1 220 and associated antenna, is integrated in a shark fin, which is located on the roof top of the vehicle. Second and third V2X communication units U2 240 and U3 260 are integrated in the side mirrors of the vehicle 200. Such an implementation of V2X communication units is found to have good performance in all directions around the vehicle 200.

In one example of the invention, as illustrated in FIG. 2, the first V2X communication unit U1 220 and associated antenna produces a far field electromagnetic (EM) wave M1 225, and second and third V2X communication units U2 240 and U3 260 respectively produce their far field EM wave M2 245 and far field EM wave M3 265. The communication range of these EM waves can be several hundreds of meters and are used in the normal (first) V2X communication mode of operation. The three EM waves M1 225, M2 245 and M3 265, in this Illustration, are different as they are originating from differently located units connected to different antennas. However, the three EM waves M1 225, M2 245 and M3 265 will have the same operating frequency.

In accordance with examples of the invention, the three V2X communication units are additionally configured to wirelessly distribute, in a second mode of operation, received data obtained in a first mode of operation, such as from V2X received date, as described above. Alternatively, for example if either of the three V2X communication units (such as slave unit U2 240) is identified as having a transmitter (or transmit antenna) failure in the first (normal) mode of operation, this information is transmitted wirelessly to one of the other in-vehicle communication units (such as master unit U1 220) using the low-power second mode of operation. This other in-vehicle communication unit subsequently processes and re-transmits the received data in the normal (first) V2X communication mode of operation.

Figure 3:
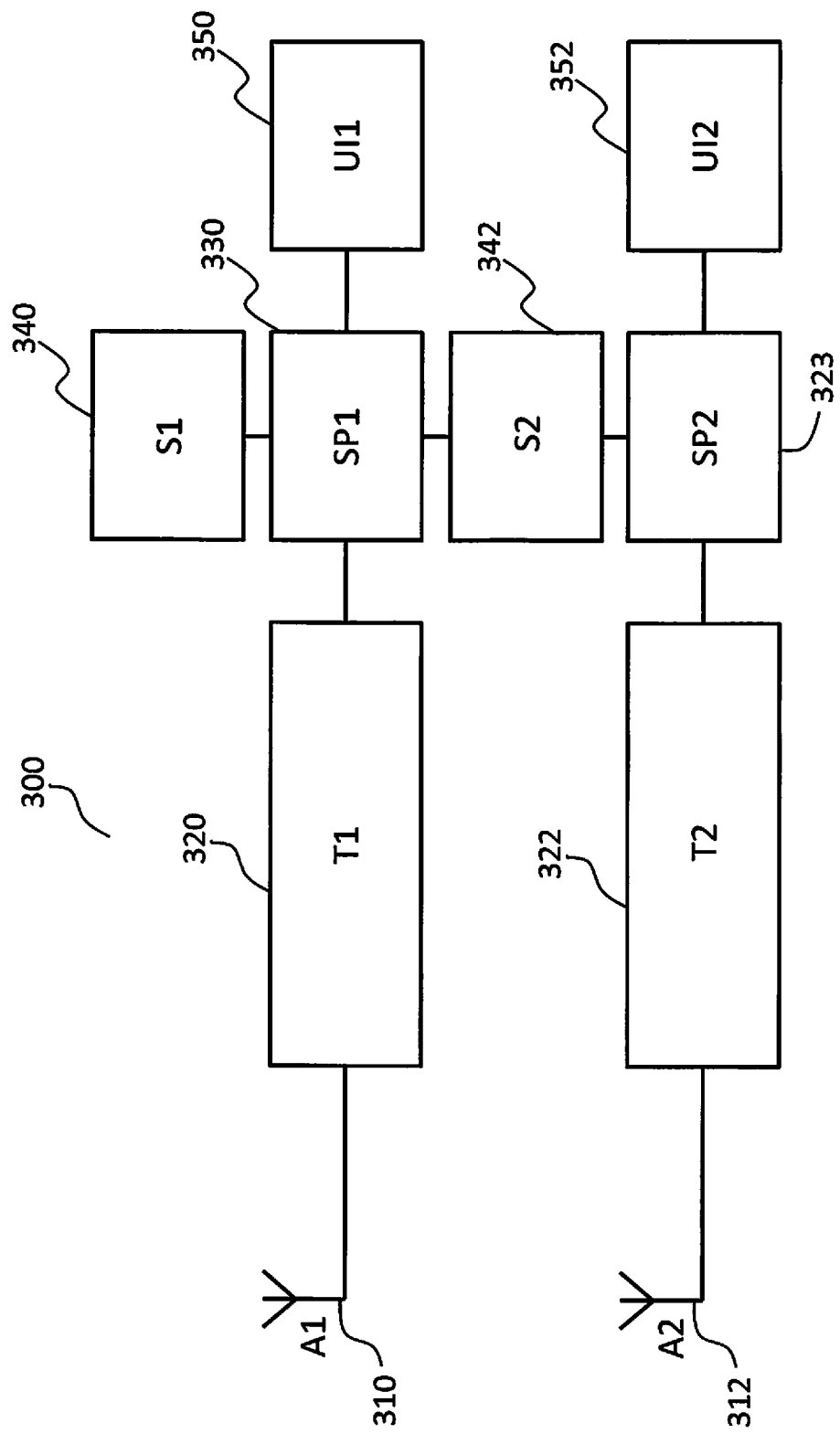
FIG. 3 illustrates a schematic of an example implementation of a V2X communication unit, according to example embodiments of the invention.

Referring now to FIG. 3, an example schematic of a possible implementation of a V2X communication unit 300 is illustrated, according to examples of the invention. A first chain of the communication unit 300 is configured to communicate according the IEEE802.11p standard in the 5.855-5.925 GHz frequency band (Europe and USA) and is used to support normal V2X communications. Here, a first antenna A1 310 is connected to a first radio transceiver T1 320. The data output of T1 320 is than processed by the signal processor SP1 330. S1 340 is an optional security unit configured to protect the communication Information. An optional user interface UI1 350 may be configured to present data to a user.

In accordance with examples of the invention, a second chain of the communication unit 300 is configured to communicate for example according to RLAN in the ITS-G5C (5.470-5.725 GHz) frequency band (Europe and USA) in a second operational mode that is configured to wirelessly distribute data, such as V2X data, between the vehicle's communication units. The antenna A2 312 is connected to the radio transceiver T2 322. The data output of T2 is then processed by the signal processor SP2 323. S2 342 is the optional security unit to protect the communication information in this second mode of operation. UI2 352 presents the optional user interface.

Although two security units S1 340 and S2 342 are illustrated in this example, it is envisaged that in other examples a single security unit could be used to handle the security tasks for both modes of operation, not least as a result of the security data typically being handled in a digital form. Similarly, although two user interfaces UI1 350 and UI2 352 are illustrated in this example, it is envisaged that in other examples a single user interface could be used to handle the user interface tasks for both modes of operation, not least as a result of the user interface data also typically being handled in a digital form.

In some examples, the first (normal V2X) communication mode 'M' is configured in accordance with the IEEE802.11p standard, whereby a vehicle's communication unit communicates with other vehicles in its locality in the environment with an output power of +20 dBm in the 5.855-5.925 GHz frequency band. The receiver sensitivity can be for example −92 dBm, which allows, in most favourable conditions, a communication range of more than 1000 meters.

In contrast, the range between the different communication units U1, U2 and U3 for in-vehicle communications is relative small, typically of the order of meters. Therefore, in some examples of the invention and due to the relative short (in-vehicle) range, the output power for the in-vehicle communication is reduced. In some examples, the reduction in output power may result in a fixed output power setting for the transceiver 322 when configured to operate in the second 'N' communication mode. In some examples, the output power may be adaptively according to the actual required level to establish a communication link within the vehicle. In this example, a power control technique may be employed by the transmitter arranged to support the second mode of operation, such as located in transceiver 322 of FIG. 3 and be fixed at installation on a per vehicle basis (e.g. dependent upon the type of vehicle). In this manner, the power control technique applied can be configured to set a suitable output power that can ensure the received power of the transmitted signal arrives at the master unit receiver just above its respective receiver sensitivity level. In some examples, the antenna gain at both communication ends may be set at 0 dBi.

Figure 4:
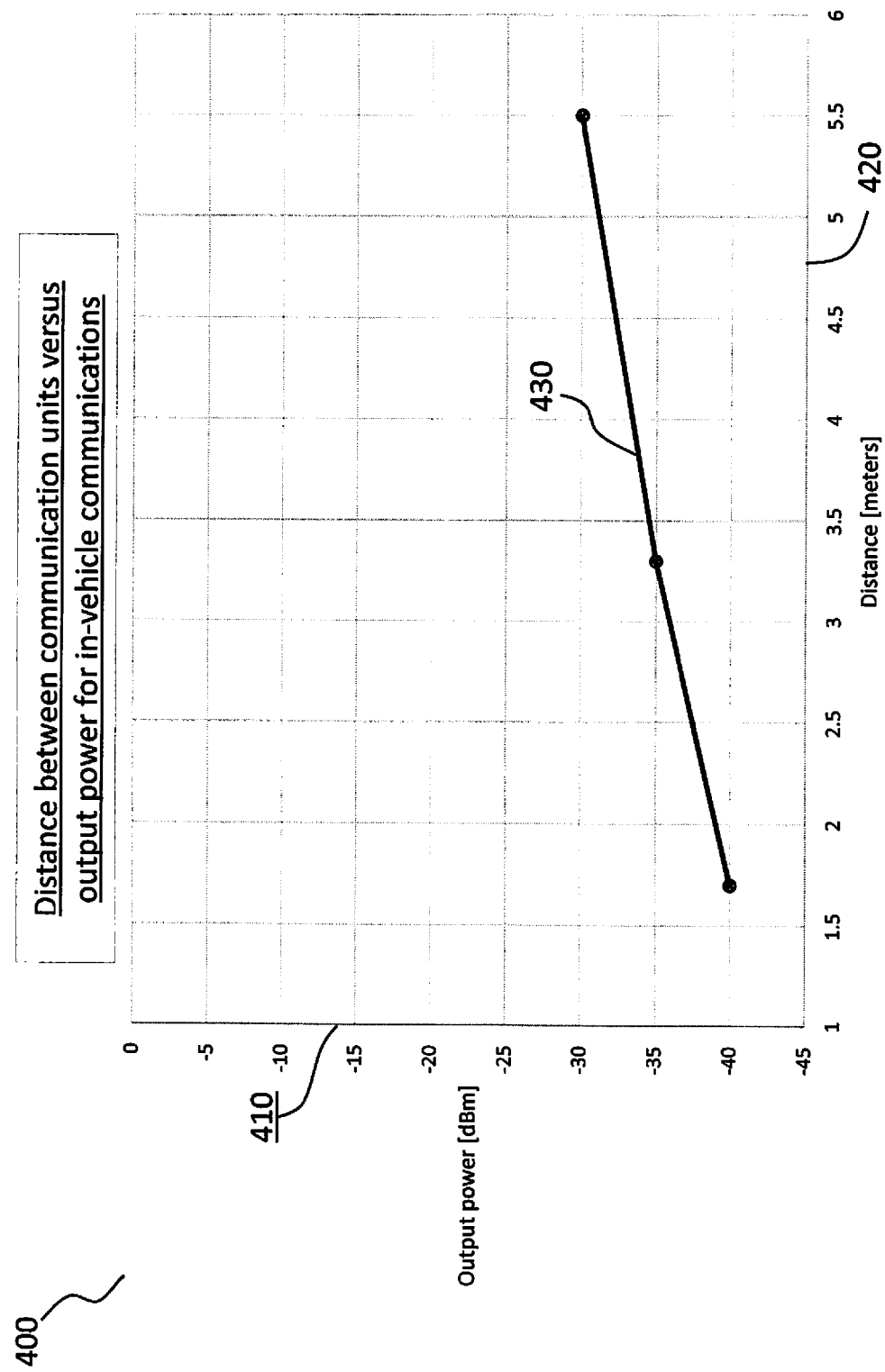
FIG. 4 illustrates a graphical example of transmitter output power [dBm] versus communication link distance [meters] for a receiver sensitivity of −92 dBm in case of operating in a second communication mode, according to examples of the invention.

Referring now to FIG. 4, a graphical example 400 illustrates transmitter output power [in dBm] 410 versus communication link distance [in meters] 420 between in-vehicle communication units having a receiver sensitivity of −92 dBm 430, in case of a second communication mode, according to examples of the invention. In this example, FIG. 4 shows the communication range of interest for the wireless vehicle network operating in the G5C (5.470-5.725 GHz) frequency band (Europe and USA). Here, for example for a vehicle of 3-4m in length, with 2 metres being configured as a maximum distance between all communication units, a fixed transmit output power of −35 dBm may be employed by the respective communication units when configured to operate in the wireless, second mode ('N') of operation, for in-vehicle communications. Alternatively, for a truck of, say, 6 m in length, with say 5 metres being configured as a maximum distance between all communication units of the truck, a transmit output power of −30 dBm may be employed by the respective communication units when configured to operate in the wireless, second mode ('N') of operation, for internal truck communications.

The graph in FIG. 4 makes use of the well-known formula that can be found in the book of Theodore S. Rappaport, Wireless Communications, ISBN0-13-375536-3 page 129. Here, $$\text{path loss} = 20 \times \log(4 \times pi \times do/\text{lambda}) + 10 \times N \times \log(d/do) \quad [1]$$

where:
Path loss=signal loss due to distance in air [dB]
do=reference distance of 1 meter [m]
Lambda=wavelength of the radio frequency [m]
N=propagation factor depending on environment, set at 2 (free space)
d=communication distance [m]
The received signal strength of the radio signal, S [dBm], can then be calculated by the well-known communication link budget formula:

$$S = \text{Tx power} - \text{Path loss} + Gtx + Grx \quad [2]$$

Where:
Tx power=Transmitter output power [dBm]
Gtx=antenna gain of the transmitter [dB]
Grx=antenna gain of the receiver [dBi]
At both receiver inputs, i.e. for both N' and 'M' modes of operation in some examples of the invention, highly selective filters may be used to reduce 'out-of-band' interference. Notably, in some examples of the invention, both 'N' and mode 'M' modes of operation may use different transmit frequencies. For example, communication mode 'M' may be configured to operate at 5.9 GHz, whilst a separate transceiver may be used to operate in the second communication mode 'N' and configured to operate at 5.5 GHz in a frequency duplex arrangement. A receiver topology that provides a sensitivity performance of −92 dbm enables the communication unit to operate using both these operational modes. In this manner, it is envisaged in some examples that the second 'N' communication mode can work concurrently with the first 'M' communication mode and there is no interference from a transmitter of one communication unit at a first frequency of 5.9 GHz with another communication unit's receiver configured to receive transmissions at 5.5 GHz. In some examples, it is envisaged that the second 'N' communication mode may be configured to operate in other frequency bands, such as for example the 2.5 GHz ISM frequency band. In other examples, it is envisaged that the second communicating mode N may also use adaptive frequency bands or channels. At the receiver side the received signal strength indication (RSSI) and/or received bit error rates (BER) are monitored on a per used frequency band or channel basis. This allows the communication unit to be able to build up a history of the communication unit's performance and thereby helps to predict the most likely interference-free frequency band or channel. The use of adaptive frequency bands or channels may be used in the vehicle to further combat potential interference problems. For example, a master unit may be configured to re-configure one or more of the slave units to change its frequency channel, to a 'clear' channel. In this manner, the second communication unit may benefit from enhanced communication speed. In other examples, it is envisaged that the second communicating mode ('N') may also use time division multiplexing techniques to overcome RF and timing communication issues. In this manner, the communication unit alternates its transmissions from a normal (first) V2X mode of operation to an in-vehicle (second) mode of operation on a time-divided basis.

In other examples, it is envisaged that a master unit may be able to determine that a driver or passenger of the vehicle may be using a smartphone at a nearby frequency or channel to the frequency or channel employed by the second communicating mode 'N'. In response to this determination, the master unit may be able to dynamically/adaptively re-configure the second communicating mode frequency bands or channels to thereby reduce interference.

Figure 5:
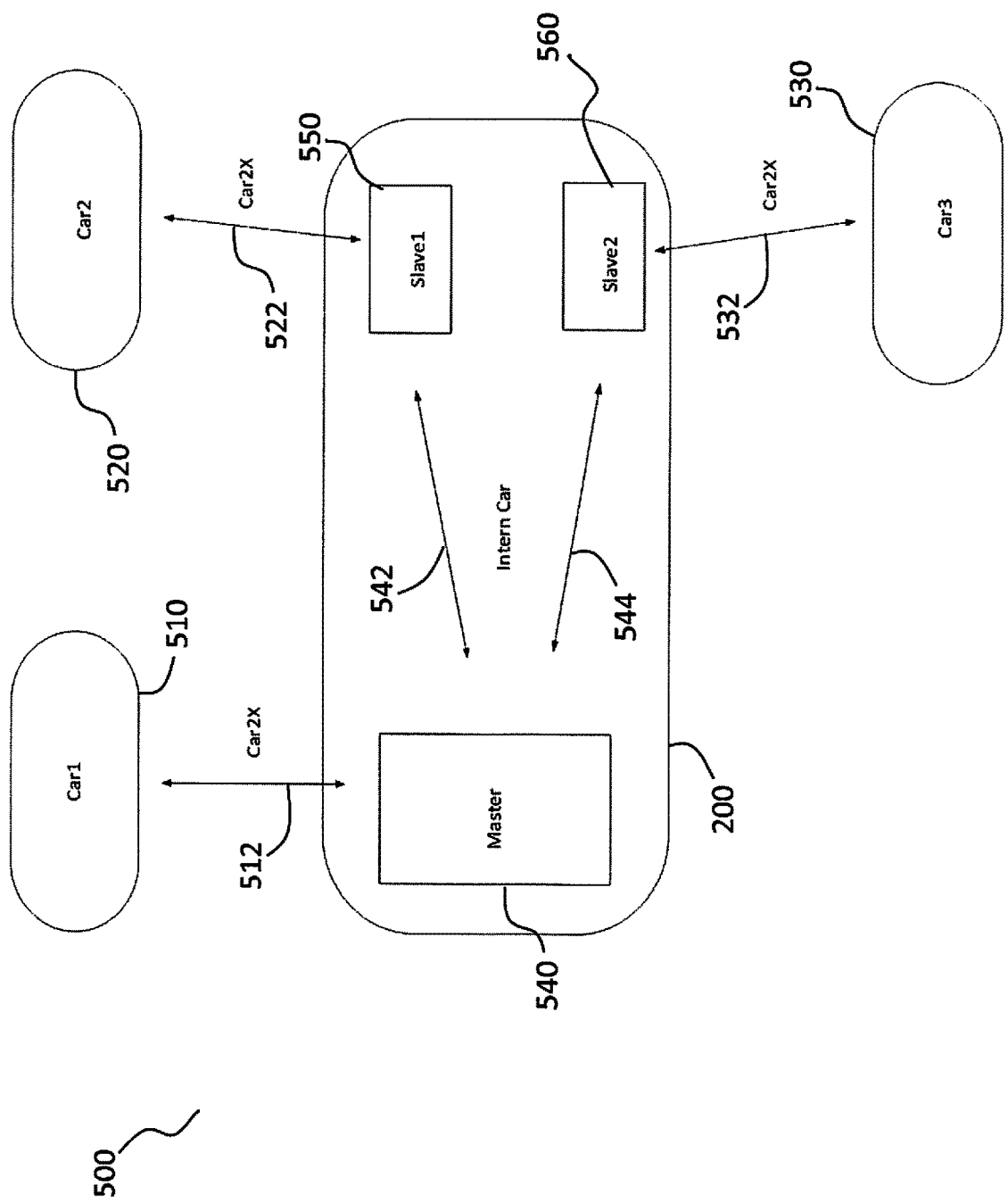
FIG. 5 illustrates a schematic of a first example of communications performed by a master unit and two slave units supporting both a normal V2X mode of operation as well as wireless in-vehicle communication, according to example embodiments of the invention.

Referring now to FIG. 5, a schematic of a first example of communications performed by a master unit and two slave units, supporting both a first, normal V2X mode of operation as well as a second, wireless (in-vehicle) communication mode of operation, is Illustrated according to examples of the invention. In this example, a vehicle 200 includes three V2X communication units, which are allocated or configured as one master unit 540 and two slave units 550, 560. In this example, three other vehicles 510, 520, 530 are identified as being in the vicinity/neighbourhood of vehicle 200. In accordance with normal V2X communication, the master unit 540 is transmitting and receiving V2X data 512 with first vehicle 510, the first slave unit 550 transmitting and receiving V2X data 522 with second vehicle 520 and the second slave unit 560 is transmitting and receiving V2X data 532 with third vehicle 530.

In accordance with examples of the invention, the vehicle 200 is configured to support the second, wireless (in-vehicle) communication mode of operation, with wireless V2X data 542, 544 between the master unit 540 and both the first slave unit 550 and the second slave unit 560. In this example, the second, wireless (in-vehicle) communication mode of operation (mode 'N') employs RLAN ITS-G5C (5.470-5.725 GHz) frequency band (Europe and USA). In some examples, the range of this second wireless (in-vehicle) communication mode of operation (mode 'N') may be determined by the parameters and is in the order of a few meters. In some examples, the wireless in-vehicle network may be adaptable in terms of the number of communication devices that are used or available.

In this example of the invention, it is envisaged that the second communication mode may be used for in-vehicle wireless communications in order to transfer status information relating to the at least one slave communication unit to the master communication unit.

Figure 6:
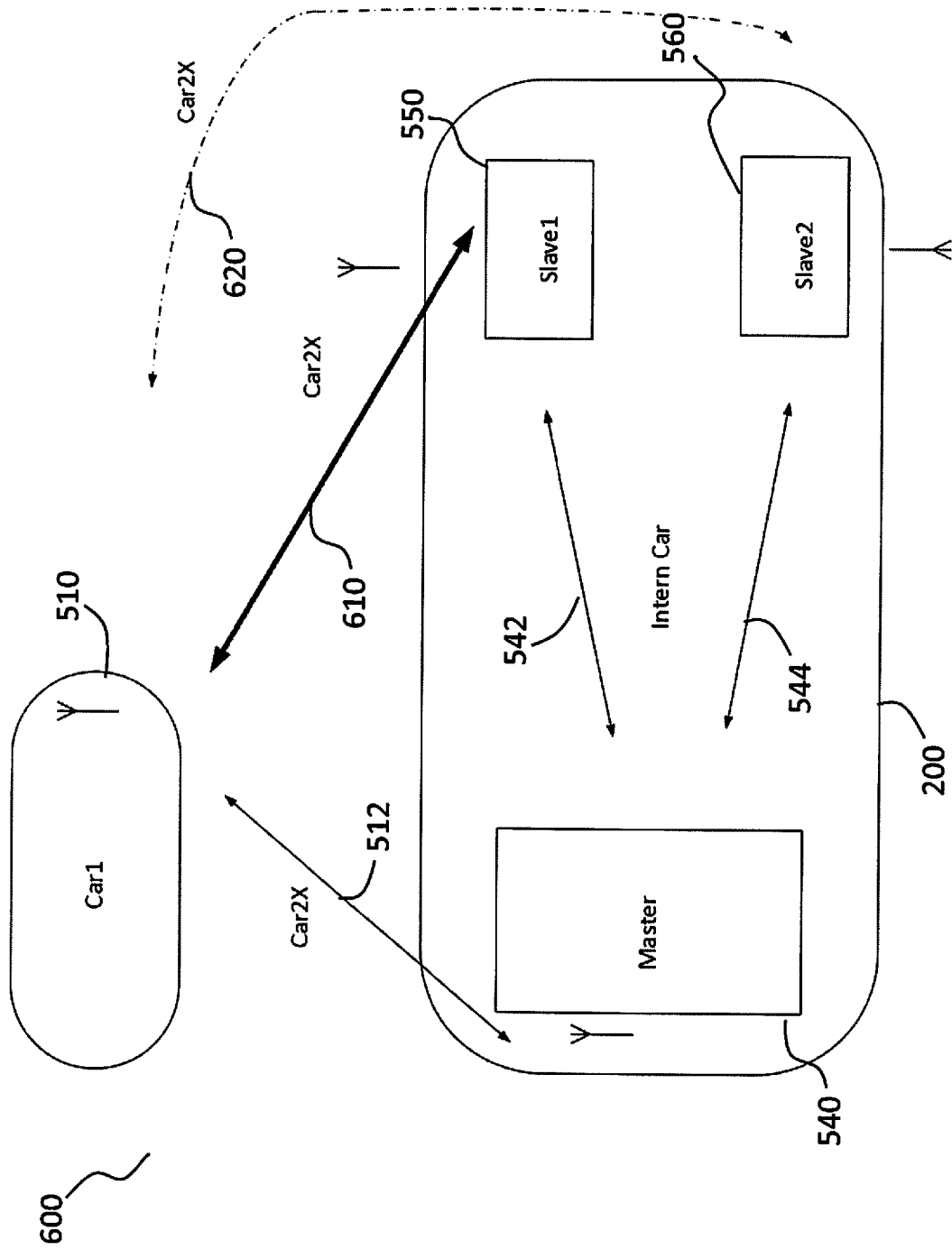
FIG. 6 illustrates a schematic of a second example of communications performed by a master unit and two slave units supporting both a normal V2X mode of operation as well as wireless in-vehicle communication, where the in-vehicle communication is used to supplement the first normal V2X communication mode of operation, according to example embodiments of the invention.

Referring now to FIG. 6, a schematic 600 of a second example of communications performed by a master unit and two slave units in a vehicle 200 supporting both a normal V2X mode of operation, as well as a second, wireless (in-vehicle) communication mode of operation, is illustrated according to examples of the invention. In this example, a vehicle 200 again includes three V2X communication units, which are allocated or configured as one master unit 540 and two slave units 550, 560. In this example, one other vehicle 510 is identified as being in the vicinity/neighbourhood of vehicle 200. In accordance with normal V2X communication, the master unit 540 is transmitting and receiving V2X data 512 with first vehicle 510. Here, it is noted that in typical practical scenarios, the first slave unit 550 may also be transmitting and receiving V2X data 610 with first vehicle 510 and the second slave unit 560 may also be transmitting and receiving V2X data 620 with the first vehicle 510.

Here, in this example, the in-vehicle communication is used to supplement the first normal V2X communication mode of operation. The vehicle 200 is configured to operate in a first normal V2X communication ('M') mode, whereby the master unit 540 is able to transmit V2X data 512 to, and receive V2X data 512 from, a first car 510.

In accordance with examples of the invention, this embodiment proposes an additional short range wireless connection that is performed between the master unit 540 and one or more slave units 550, 560, communication units within the vehicle, in order to relay normal V2X communications to or from another vehicle, such as vehicle 510 in the vicinity of the vehicle 200.

In this scenario, a first slave communication unit 550 receives V2X communications from a first vehicle 510 using the normal (first) communication mode of operation, in this example according to the IEEE802.11p. In some examples, the first slave communication unit 550 then re-transmits the received V2X data using the second, in-vehicle communication mode of operation to the master unit 540. In such a configuration, the master unit 540 is able to wirelessly receive V2X data from other communication units within the vehicle without any need for a wired connection, such as an Ethernet cable connecting the vehicle's communication units.

In some examples, it is known that communication units positioned in different physical locations around the vehicle 200 will create different results of V2X signal reception quality from the vehicle 510. In a worst case scenario, some communication units, such as slave unit 1 550 and/or slave unit 2 560, may receive data via wireless communication links 610, 620 using the normal (first) communication mode of operation, where processing the received data identifies that some of the data is corrupted and some of the data is still useable. In this example, it is envisaged that the slave unit 1 550 and/or slave unit 2 560 re-transmit the respective data obtained using the normal (first) communication mode of operation to the master unit 540 using the second, in-vehicle communication mode of operation. In such a scenario, the best quality received data may be used as the final V2X data of the first vehicle 510. In some examples, this data will be generated at the master unit using a combination of the data received from multiple communication units, such as master unit 540, slave unit 1 550 and/or slave unit 2 560. Alternatively, for example, the data received from the first vehicle 510 at slave unit 2 560 may be of poorer quality than the data from the first vehicle 510 as received at the master unit 540 or slave unit 1 550. In such a case the 'corrupted' data of slave unit 2 560 may be Ignored.

In a further example of the invention, it is envisaged that slave unit 1 550 may transmit data to the first vehicle 510. However, this data may not be successfully received by the first vehicle 510. In such a case the master unit 540 may decide to use the second, in-vehicle communication mode of operation to instruct slave unit 2 560 to re-transmit the data again to the first vehicle 510. Since this slave unit 2 560 has an antenna at a different location within the vehicle, which exhibits different radiation characteristics, the data may then be successfully received at first vehicle 510 via slave unit 2 560.

For V2X communication, safety is priority. Consequently, this requires that at all times each of the communication units are required to be operational and providing an excellent performance. In some examples, the wireless local network operates in the second 'N' communication mode is arranged to communicate a status of the respective (slave) communication node to the master unit. In such a configuration, the results of a self-testing process performed by the slave unit can be relayed to the master unit. For example, antenna functionality, radio functionality and other functions can be tested or monitored remotely and the results relayed to the master unit. In some examples, the master unit may be configured to poll one or more slave units in order to determine a status of the respective slave unit(s).

Figure 7:
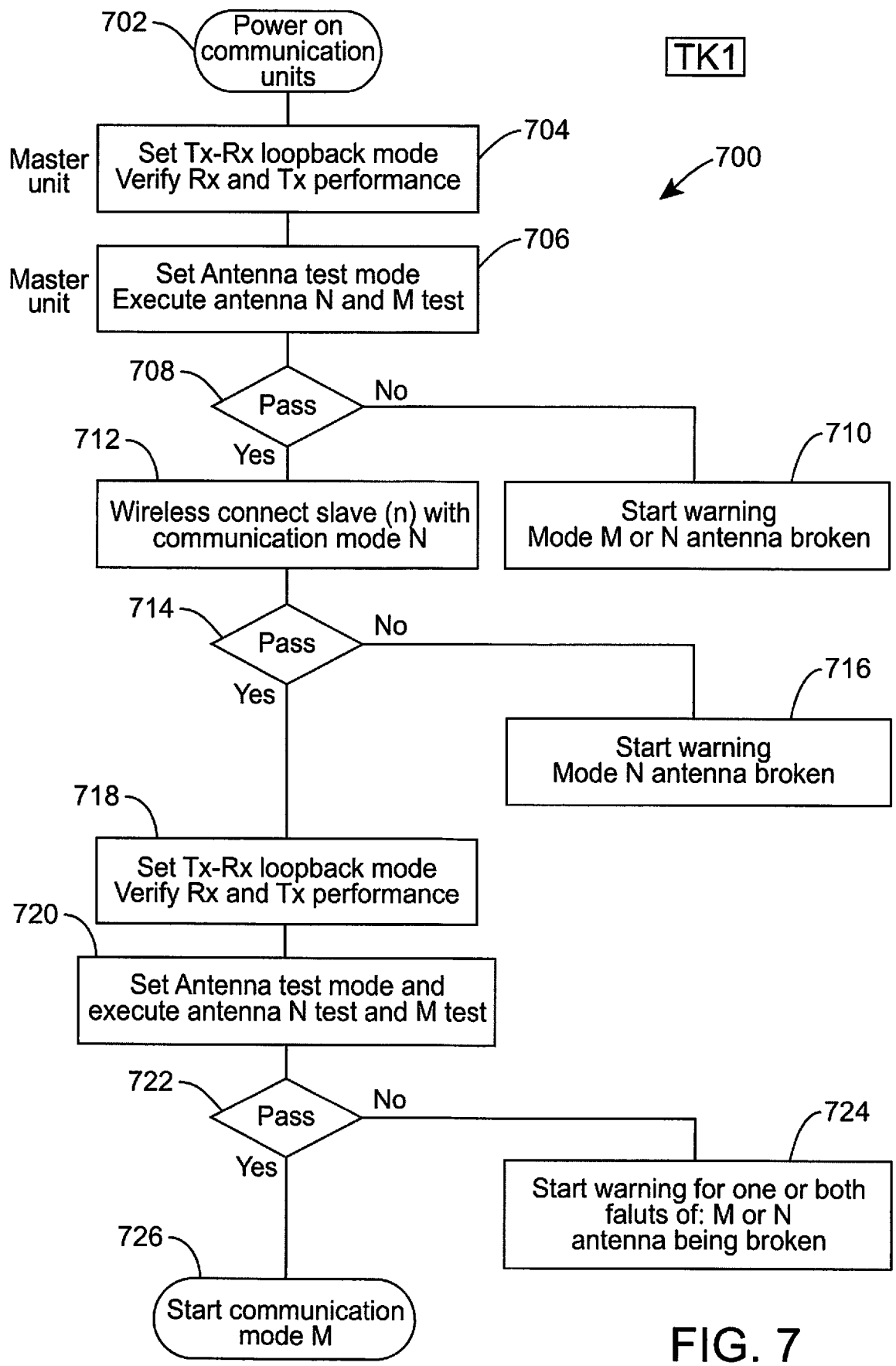
FIG. 7 illustrates a first simplified flowchart of a method of dynamically setting up master/slave roles within a plurality of distributed communication units in a vehicle, according to example embodiments of the invention.

FIG. 7 illustrates a simplified flowchart of a method of dynamically setting up master/slave units within a plurality of distributed communication units in a vehicle, according to example embodiments of the invention. The method of FIG. 7 starts at 702 with a power 'on' of the vehicle's communication units and moves on to 704 where a communication unit allocated as a master unit is set up in a transmit-receive (Tx-Rx) normal (first) V2X communication loop mode, in order to verify the respective performance of the master unit's transmitter and receiver. At 706, the master unit is placed in an antenna/transceiver test mode, whereby respective antennas in two respective operational modes, mode 'N' and mode 'M', are tested. A determination is made at 708 as to whether the master unit has passed the test. If it has not passed the test, in 708, a warning is set that either the antenna or an associated transceiver circuit or component has failed, in either mode 'N' or mode 'M', In 710.

If the master unit has passed the test, in 708, it is confirmed as the master unit and the flowchart moves to 712. Here, the master unit is connected with one or more slave units, each configured to operate in the second mode ('N') of operation. A determination is made at 714 as to whether the communication link(s) to the one or more slave units in the second mode ('N') of operation has/have passed the test. If the communication link(s) in the second mode ('N') of operation has not/have not passed the test, in 714, a warning is set that at least one of the slave unit's antenna or an associated transceiver circuit or component has failed, in the second mode ('N') of operation, in 716.

If the communication link(s) in the second mode ('N') of operation has/have passed the test, in 714, the communication units are returned to the normal Tx-Rx loopback mode at 718 and the respective Tx and Rx performance of the slave units are verified (as the master unit has already been confirmed at 704). At 720 the slave communication units are set to an antenna test mode and the antennas tested in the first mode ('M') of operation and the second mode ('N') of operation. A determination is made at 722 as to whether the slave unit(s) has/have passed the test in the first mode ('M') of operation. If the slave unit(s) has/have passed the test in the first mode ('M') of operation, the communication units (both slave and master) are configured to operate in the first mode ('M') of operation. If the one or more slave unit(s) has not/have not passed the test In the first mode ('M') of operation, in 722, a warning Is set that either the antenna or an associated circuit or component in one or more of 'M' or 'N' chains Is broken or has failed, in mode 'M', in 724.

Figure 8:
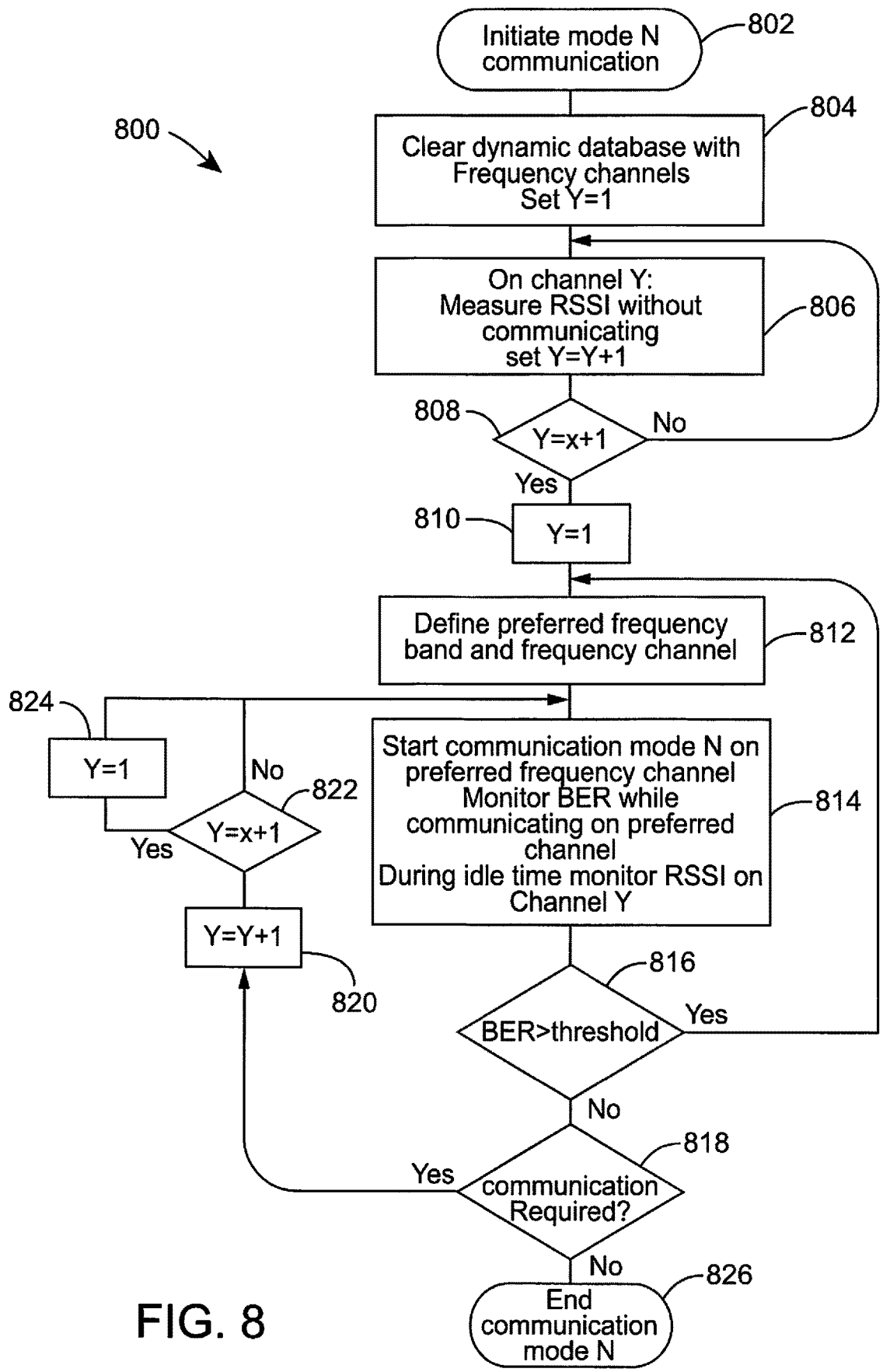
FIG. 8 illustrates a second simplified flowchart of a method of setting up a preferred communication band and frequency channel for a second communication mode 'N' of operation from within a plurality of available communication frequency bands, according to example embodiments of the invention.

Referring now to FIG. 8 illustrates a second simplified flowchart 800 illustrates a method of setting up a preferred communication bend and frequency channel for a second communication mode 'N' of operation from within a plurality of available communication frequency bends, according to example embodiments of the invention. The method starts at 802 with the second communication mode 'N' of operation being initiated after a hardware verification of the communication units and circuits. The method moves on to 804 where a dynamically updatable database, which contains all available frequency channels of different available frequency bands, is cleared. In some examples, a channel counter is also cleared. The method moves on to 806 and 808 whereby the received signal strength (RSSI) is measured for al frequency channels In a receive mode (for example with a counter 'Y' incrementing to cover each frequency channels of each available frequency bands until all measurements have been taken). At 808, a determination is made as to whether the counter has exceeded a maximum number of available frequency channels ('x'), and if it has not the flowchart loops to 806, as shown. At 808, if the counter has exceeded a maximum number of available frequency channels ('x'), the RSSI has been measured for all frequency channels in receive mode. At 810, the counter ('Y') is reset to the start.

The method moves on to 812 with the preferred frequency channel within frequency band being defined and selected. At 814, the second communication mode 'N' of operation is started on the selected frequency channel and frequency band. Whilst operating on the second communication mode 'N', the communication unit is actively monitoring and measuring the bit error rate (BER) on the selected channel. During idle time, the communication unit is also configured to measure the RSSI of channel Y and, when required, update stored values in the database.

The method moves on to 816 where a determination is made as to whether the frequency channel has to be changed due to, for example, a too high BER and the BER measurement having exceeded a threshold. If the BER measurement in 816 is not acceptable, and it has exceeded a BER threshold, communication on a new preferred frequency channel and frequency band continues by means of loop to 812. However, if the BER measurement in 816 is acceptable, and it has not exceeded a threshold, and operation in the second communication mode 'N' is still needed in 818, the channel counter is increased at 820 and operation in the second communication mode 'N' on the selected frequency is performed at 814. This process continued until a maximum number of available frequency channels ('x') has been attempted. If the channel counter has reached its maximum value at 822, it is set again at '1' in 824 so that all channels are dynamically updated into the database. If there is no longer a need for an operation in the second communication mode 'N' the flowchart is stopped at 826 and the communication unit switches to operating solely in the first communication mode 'M'.

It will be appreciated that the wireless communication units configured to operate in bother the first and second communication modes herein described and as illustrated in the accompanying drawings may be implemented as integrated circuits where the various functions are implemented as hardware blocks, computer program code running on (digital signal) processors, or a combination of hardware and software.

Accordingly, at least part of the invention may be implemented in a computer program for running on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/ dynamic load library and/or other sequence of instructions designed for execution on a computer system. The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the Illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be Illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely Illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or Intermediary components. Likewise, any two components so associated can also be viewed as being 'operably connected,' or 'operably coupled,' to each other to achieve the desired functionality. Furthermore, those skilled in the art will recognize that boundaries between the above described operations merely Illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type. Also, the Invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A wireless vehicle communication system comprising: a plurality of wireless communication units located in or attached to a vehicle, wherein
each of the plurality of wireless communication units is configured to;
operate in a first communication mode of operation that wirelessly transfers data to an external communication unit located in a vicinity of the vehicle, and
operate in a second short range communication mode of operation that wirelessly transfers data to at least one other of the plurality of communication units located in or attached to the vehicle, the wireless transfer of data in second short range communication mode using an output power that is lower than an output power used in the wireless transfer of data in the first communication mode; and
a first one of the plurality of wireless communication units is configured to communicate a common data set with both the external communication unit and a second one of the plurality of wireless communication units, respectively using the first communication mode of operation and the second short range communication mode of operation.

2. The wireless vehicle communication system of claim 1 wherein the plurality of wireless communication units are configured to communicate concurrently in the first communication mode of operation and second short range communication mode of operation using at least one of: time division duplex mode of operation or a frequency division duplex mode of operation.

3. The wireless vehicle communication system of claim 2 wherein the plurality of wireless communication units comprise an antenna operably coupled to radio frequency transceiver circuits configured to operate in either first communication mode of operation or second short range communication mode of operation.

4. The wireless vehicle communication system of claim 1 wherein transmissions on the second short range communication mode are configured to be in excess of 40 dB lower than transmissions on the first communication mode, and wherein the output power is fixed at a level of output power or set using adaptive output power control.

5. The wireless vehicle communication system of claim 1 wherein the second short range communication mode is used for in-vehicle wireless communications to transfer status information relating to at least one of the plurality of wireless communication units.

6. The wireless vehicle communication system of claim 1 wherein the second short range communication mode wirelessly distributes received data obtained in the first communication mode of operation.

7. The wireless vehicle communication system of claim 1 wherein the first communication mode operates using a first vehicle to everything (V2X) standard frequency and the second short range communication mode operates using a radio local area network (RLAN) intelligent transportation system (ITS)-G5C (5.470-5.725 GHz) standard.

8. The wireless vehicle communication system of claim 1 wherein the second short range communication mode operates using one of: Wi-Fi™ in a 2.5 GHz industrial, scientific and medical (ISM) band, Bluetooth™ in a 2.5 GHz ISM band.

9. The wireless vehicle communication system of claim 1 wherein the second short range communication mode is configured to use adaptive frequency band selection.

10. The wireless vehicle communication system of claim 1, wherein:
the second one of the plurality of wireless communication units is configured to transmit, in response to experiencing a failure in communicating a data set to the external communication unit, the data set to the first one of the plurality communication units using the second short range communication mode, and
the first one of the plurality of communication units is configured to transmit the data set to the external communication unit using the first communication mode.

11. The wireless vehicle communication system of claim 1, wherein:
the first and second ones of the plurality of wireless communication units are configured to receive common data sets from the external communication unit, and
the first one of the plurality of wireless communication units is configured to transmit, in response to the second one of the plurality of wireless communication units experiencing a failure in receiving a particular data set from the external communication unit, the particular data set as received from the external communication unit via the first communication mode, to the second one of the plurality of wireless communication units using the second short range communication mode.

12. A vehicle comprising a plurality of wireless communication units located in or attached to the vehicle, wherein
the plurality of wireless communication units is configured to operate in a first communication mode of operation that wirelessly transfers data to an external communication unit located in a vicinity of the vehicle,
the vehicle is characterized in that the plurality of wireless communication units is additionally configured to operate in a second short range communication mode of operation that wirelessly transfers data to at least one other of the plurality of communication units located in or attached to the vehicle, the wireless transfer of data in the second short range communication mode using an output power that is lower than an output power used in the wireless transfer of data in the first communication mode, and
a first one of the plurality of wireless communication units is configured to communicate a common data set with both the external communication unit and a second one of the plurality of wireless communication units, respectively using the first communication mode and the second short range communication mode.

13. A wireless communication unit for attaching to a vehicle and communicating with at least one of a plurality of wireless communication units within the vehicle and at least one communication unit located external to the vehicle, wherein
each of the plurality of wireless communication units is configured to operate in a first communication mode of operation that wirelessly transfers data to the at least one external communication unit located in a vicinity of the vehicle,
each of the plurality of wireless communication units is characterized in that each of the wireless communication units is additionally configured to operate in a second communication mode of operation that wirelessly transfers data to at least one other of the plurality of wireless communication units located in or attached to the vehicle, the wireless transfer of data in the second communication mode using an output power that is lower than an output power used in the wireless transfer of data in the first communication mode, wherein each of the plurality of wireless communication units is configured to receive data in the first communication mode and communicate the received data to another one of the plurality of wireless communication units in the second communication mode, and each of the plurality of wireless communication units is configured to transmit data in the first communication mode that is received from another one of the plurality of wireless communication units in the second communication mode to the communication unit located external to the vehicle.

14. A method of operating a wireless vehicle communication system having a plurality of wireless communication units located in or attached to a vehicle; the method comprising:

operating the plurality of wireless communication units in a first communication mode of operation that wirelessly transfers data to an external communication unit located in a vicinity of the vehicle; and operating the plurality of wireless communication units additionally in a second short range communication mode of operation that wirelessly transfers data to at least one other of the plurality of communication units located in or attached to the vehicle, the wireless transfer of data in the second short range communication mode using an output power that is lower than an output power used in the wireless transfer of data in the first communication mode, wherein a first one of the plurality of wireless communication units is configured to communicate a common data set with both the external communication unit and a second one of the plurality of wireless communication units, respectively using the first communication mode and the second short range communication mode.

15. The method of claim 14, further comprising communicating concurrently in the first communication mode of operation and second short range communication mode of operation using at least one of: time division duplex mode of operation or a frequency division duplex mode of operation.

16. The method of claim 14, further comprising using the second short range communication mode for in-vehicle wireless communications to transfer status information relating to at least one of the plurality of wireless communication units.

17. The method of claim 14, wherein the second short range communication mode comprises wirelessly distributing received data obtained in the first communication mode of operation.

18. The method of claim 14, wherein the first communication mode operates using a first vehicle to everything (V2X) standard frequency and the second short range communication mode operates using a radio local area network (RLAN) intelligent transportation system (ITS)-G5C (5.470-5.725 GHz) standard.

19. The method of claim 14, wherein the second short range communication mode operates using one of: Wi-Fi™ in a 2.5 GHz industrial, scientific, and medical (ISM) band, Bluetooth™ in a 2.5 GHz ISM band.

20. The method of claim 14, further comprising configuring the second short range communication mode to use adaptive frequency band selection.

21. The method of claim 14, wherein transmissions on the second short range communication mode are configured to be at least 40 dB lower than transmissions on the first communication mode.

22. The method of claim 21, wherein transmit output power of transmissions on the second short range communication mode is set using adaptive output power control.

* * * * *